April 24, 1928. 1,667,656
W. A. DILZELL
ANTITHEFT ATTACHMENT FOR METERS
Filed Aug. 16, 1926 4 Sheets-Sheet 1

W. A. Dilzell
INVENTOR
BY Victor J. Evans
ATTORNEY

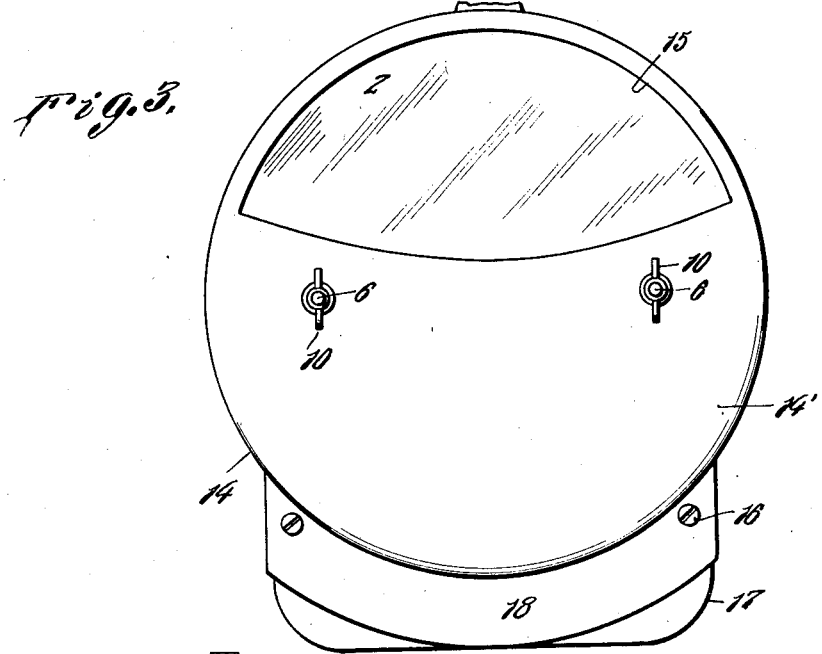
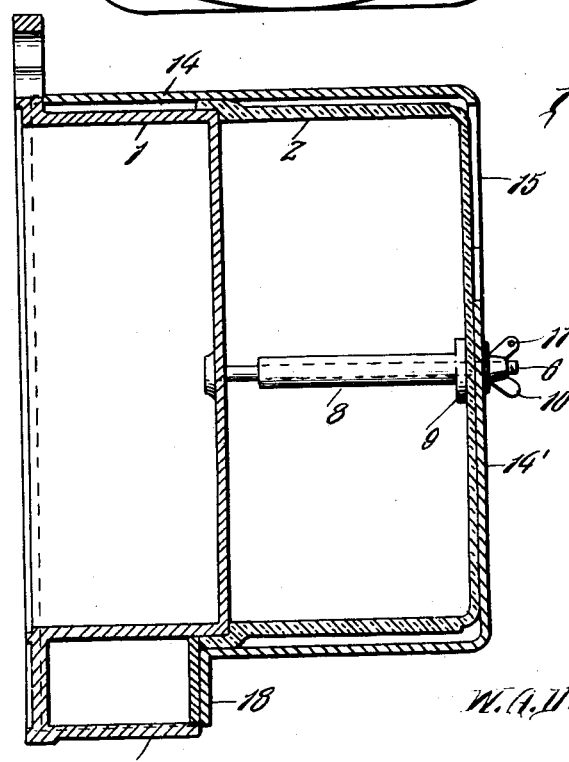

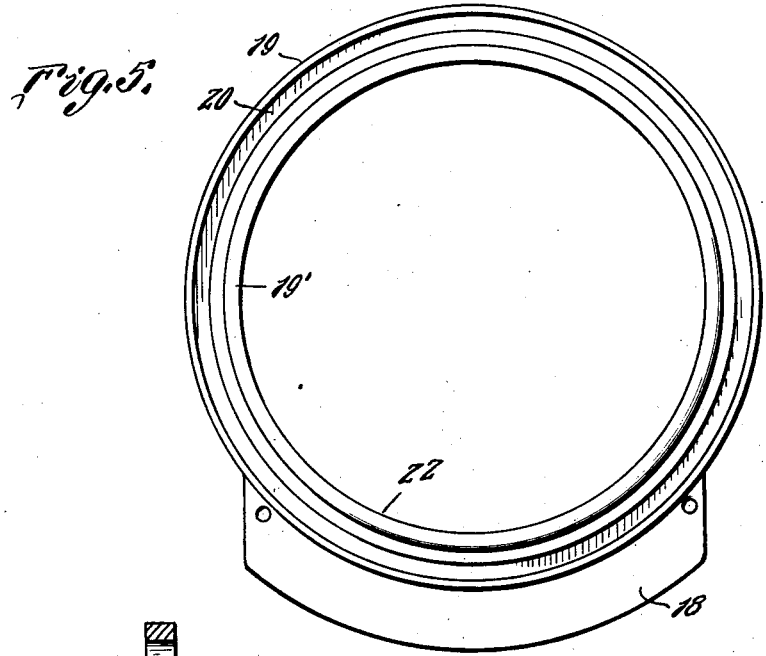
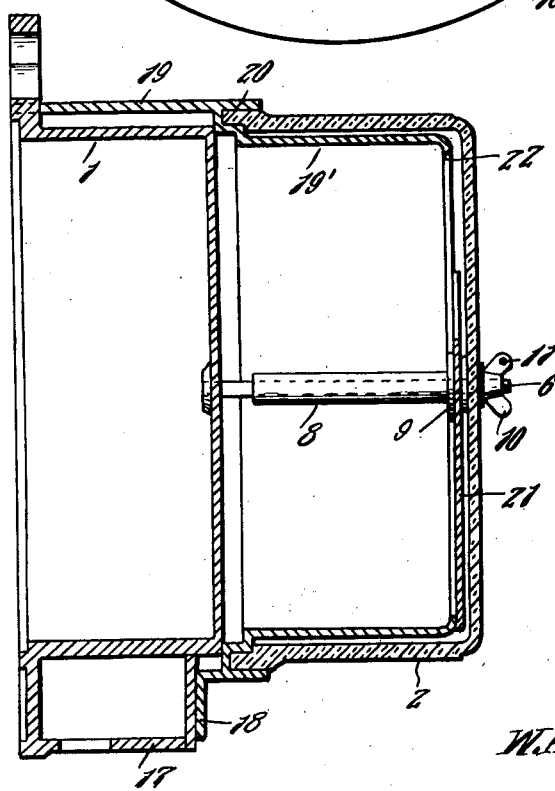

April 24, 1928.

W. A. DILZELL

ANTITHEFT ATTACHMENT FOR METERS

Filed Aug. 16, 1926

W. A. Dilzell
INVENTOR

BY Victor J. Evans
ATTORNEY

Patented Apr. 24, 1928.

1,667,656

UNITED STATES PATENT OFFICE.

WALTER A. DILZELL, OF NEW ORLEANS, LOUISIANA.

ANTITHEFT ATTACHMENT FOR METERS.

Application filed August 16, 1926. Serial No. 129,627.

This invention relates to an attachment for meters, the general object of the invention being to provide means for prevention of the insertion of an object between the cover and body of a meter to render the meter inactive and thus permit use of electric current without the meter recording the amount of consumption.

Another object of the invention is to so form the parts of the invention that they can be easily and quickly applied to meters as now constructed.

This invention also consists in certain other features of construction and in the combination and arrangement of the several parts, to be hereinafter fully descibed, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a view similar to Figure 1 but showing a modification.

Figure 4 is a sectional view through Figure 3.

Figure 5 is a view similar to Figure 1 but showing a further modification.

Figure 6 is a sectional view through Figure 5.

Figure 1:
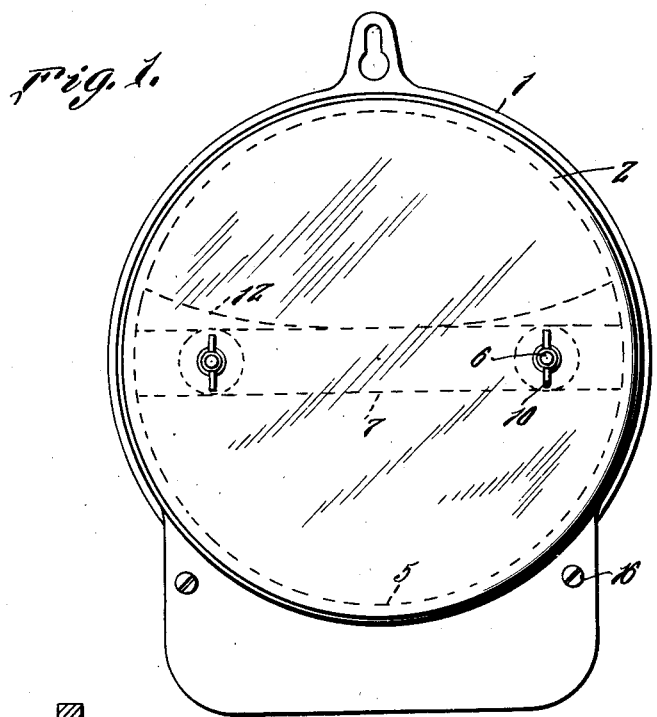
Figure 1 is a face view of a meter to which one form of the invention is applied.
Figure 2:
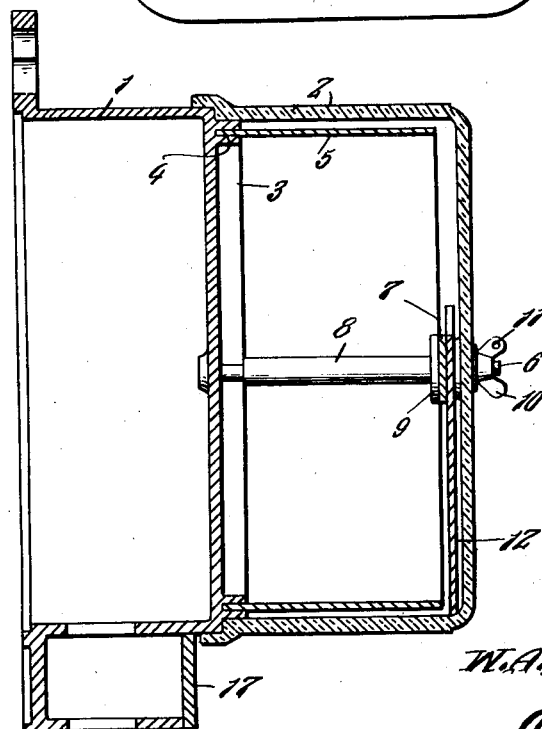
Figure 2 is a sectional view through Figure 1 but omitting the interior parts of the meter.

As is well known theft of current is often accomplished by rendering a meter inactive by inserting a piece of wire or the like between the base 1 of the meter and its cover 2 to short circuit the meter so that the flow of current will not be recorded. It is the object of my invention to prevent the insertion of such a wire or other object and in carrying out my invention I provide a barrier which will prevent the insertion of an object between the base and the cover of the meter. In the form shown in Figures 1 and 2 I provide an annular rib 3 on the base 1 against which the cover 2 rests and I form a groove 4 in said rib. A cylinder 5 has one edge inserted in the groove, the cylinder being arranged within the cover and it is held in place by the bolts 6 which hold the cover in place as said bolts pass through holes formed in a cross piece 7 on the outer end of the cylinder. Tubes 8, having flanges 9 at their outer ends, are placed on the bolts with the flanged ends resting against the cross piece and their other ends adapted to rest upon a portion of the meter which is not shown in Figure 2. The wing nuts 10 which engage the bolts 6 for holding the parts assembled are provided with holes 11 so that the two nuts can be wired together and the ends of the wire sealed in the usual manner to prevent the cover from being removed by an unauthorized person.

I also prefer to provide a cover plate 12 for the cylinder which is of substantially crescent shape so that its cut away part will permit reading of the meter. This plate rests upon the cross piece 7 and it is provided with the holes 13 through which the bolts 6 pass.

It will thus be seen that any attempt to insert an object between the cover 2 and the base 1 in order to reach the motor of the meter will be frustrated by the rib 3 and the cylinder 5.

In the construction shown in Figures 3 and 4 the barrier represented by the casing 14 is located outside of the meter instead of inside the cover, as shown in the first form. This casing is provided with a cover 14' which is of the same shape as the plate 12 so as to leave an opening 15 through which the meter can be read through the glass cover. The bottom of the casing 14 rests against the bottom of the base 1 and the casing is held in place in the same manner as in the first form of the invention and in addition by means of the screws 16 in the extension 17 of the meter engaging holes formed in a flange 18 formed on the casing and which rests upon said extension 17. As will be seen this casing covers the joint between the glass cover 2 and the base 1 of the meter and thus prevents an object being inserted at this point.

In the modification shown in Figures 5 and 6 the casing 19 has its outer half 19' of reduced diameter so that it will fit within the cover of the meter and a groove 20 is formed at the junction of the parts 19 and 19' to receive the edge of said cover. This casing is also held in place by the wing nuts and the screws as described in the second form of the invention. In this third form, however, the cover plate 21 of the casing is formed separate and rests upon an inwardly turned flange 22 of the part 19' and this cover plate is provided with holes for receiving the fastening bolts of the cover as described in the first form. In this case the cover is arranged outside of the casing instead of inside as in the second form.

Figure 7:
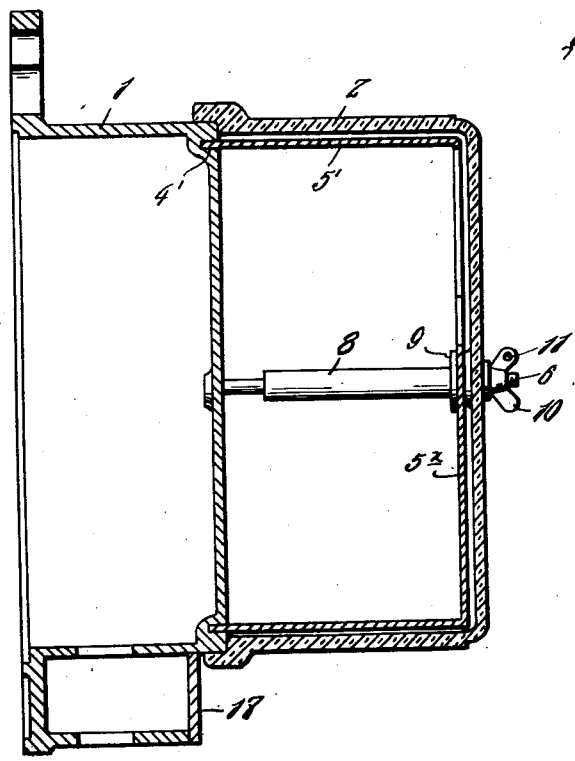
Figure 7 is a sectional view through a further modification.
Figure 8:
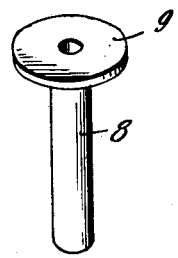
Figure 8 is a view of one of the flanged tubes.
Figure 9:
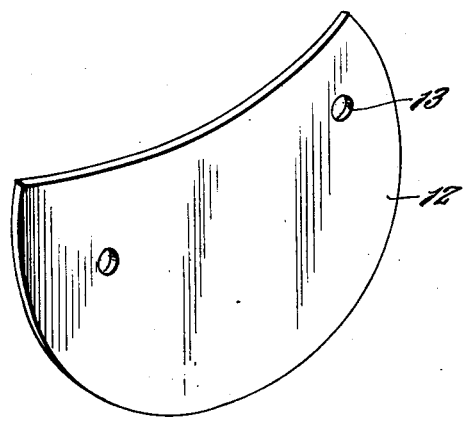
Figure 9 is a view of the cover plate.

In the form shown in Figure 7 the groove 4' is made directly in the base 1 instead of in a rib formed in the base as in the first form and the cylinder 5' has one end fitting in said groove. This cylinder has its cover plate 5× formed integral therewith instead of separately.

It will be seen that in all the forms a barrier is arranged at the junction of the cover of the meter with the base or body thereof and this barrier will prevent the introduction of a wire or other object between the cover and base to short circuit the motor of the meter.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with the base and cover of a meter, the base having an annular groove therein adjacent its point of junction with the cover, a cylinder within the cover and having one end entering the groove, the other end of the cylinder being spaced a short distance from the closed end of the cover, bolts for connecting the cover with the base and means on the cylinder engaged by the bolts for holding the cylinder in place.

2. In combination with the base and cover of a meter, the base having an annular groove therein adjacent its point of junction with the cover, a cylinder within the cover and having one end entering the groove, the other end of the cylinder being spaced a short distance from the closed end of the cover, bolts for connecting the cover with the base, means on the cylinder engaged by the bolts for holding the cylinder in place, and a cover plate for the cylinder formed to leave an opening to permit reading of the meter.

In testimony whereof I affix my signature.

WALTER A. DILZELL.